United States Patent
Kaushik et al.

(10) Patent No.: US 9,515,918 B2
(45) Date of Patent: Dec. 6, 2016

(54) COMPUTING FORWARDING TABLES FOR LINK FAILURES

(71) Applicant: International Business Machines Corporation, Armonk, NY (US)

(72) Inventors: Meenakshi R. Kaushik, Santa Clara, CA (US); Chandramouli Radhakrishnan, San Jose, CA (US); Daljeet Singh, Watsonville, CA (US)

(73) Assignee: International Business Machines Corporation, Armonk, NY (US)

(*) Notice: Subject to any disclaimer, the term of this patent is extended or adjusted under 35 U.S.C. 154(b) by 215 days.

(21) Appl. No.: 14/082,610

(22) Filed: Nov. 18, 2013

(65) Prior Publication Data

US 2015/0138957 A1 May 21, 2015

(51) Int. Cl.
| | | |
|---|---|---|
| *H04L 12/703* | (2013.01) | |
| *H04L 12/24* | (2006.01) | |
| *H04L 12/751* | (2013.01) | |
| *H04L 12/707* | (2013.01) | |
| *H04L 12/733* | (2013.01) | |

(52) U.S. Cl.
CPC ........... *H04L 45/28* (2013.01); *H04L 41/0659* (2013.01); *H04L 45/02* (2013.01); *H04L 45/122* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 7,496,650 B1* | 2/2009 | Previdi ................. | H04L 45/028 370/229 |
| 8,670,326 B1* | 3/2014 | Balasubramanian ... | H04L 45/22 370/238 |
| 2006/0291378 A1* | 12/2006 | Brotherston et al. ......... | 370/221 |
| 2007/0140128 A1* | 6/2007 | Klinker .................. | H04L 29/06 370/238 |
| 2011/0194403 A1* | 8/2011 | Sajassi et al. ................ | 370/217 |
| 2011/0299406 A1* | 12/2011 | Vobbilisetty ............ | H04L 43/10 370/248 |
| 2012/0182866 A1* | 7/2012 | Vinayagam et al. ......... | 370/228 |
| 2012/0243539 A1 | 9/2012 | Keesara | |

(Continued)

FOREIGN PATENT DOCUMENTS

WO 2012109941 A1 8/2012

OTHER PUBLICATIONS

Eastlake et al., "TRILL: Multi-Topology <draft-eastlake-trill-multi-topology-00.txt>", Sep. 3, 2013, pp. 1-44, Internet-Draft, Expires Mar. 2, 2014, <tools.ietf.org/html/draft-eastlake-trill-multi-topology-00>.

(Continued)

*Primary Examiner* — Fan Ng
*Assistant Examiner* — Rodrick Mak
(74) *Attorney, Agent, or Firm* — Stephen R. Yoder; William H. Hartwell (57) ABSTRACT

A method for maintaining a bridging network communication path table is presented and includes determining a failed communication link between a first bridge computer and a second bridge computer in the bridging network; identifying, in the communication path table, a first path that includes the failed communication link; and indicating that the first path is not active.

12 Claims, 5 Drawing Sheets

(56) References Cited

U.S. PATENT DOCUMENTS

| | | | |
|---|---|---|---|
| 2012/0300620 A1* | 11/2012 | Kothari et al. | 370/225 |
| 2012/0320739 A1 | 12/2012 | Kamath et al. | |
| 2013/0022052 A1* | 1/2013 | Takase et al. | 370/409 |
| 2014/0269260 A1* | 9/2014 | Xue | 370/225 |
| 2015/0139234 A1* | 5/2015 | Hu | H04L 45/66 370/392 |

OTHER PUBLICATIONS

Internet Society et al., "Using the IPv6 Flow Label for Equal Cost Multipath Routing and Link Aggregation in Tunnels (RFC6438)", An IP.com Prior Art Database Technical Disclosure, Original Publication Date: Nov. 1, 2011, IP.com No. IPCOM000213147D, IP.com Electronic Publication: Dec. 6, 2011.

Lappeteläinen, Ari, "Equal Cost Multipath Routing in IP Networks", Thesis submitted for examination for the degree of Master of Science in Technology, Mar. 17, 2011, Aalto University School of Science and Technology.

Mehta, et al., "A Resolution to the Equal-Cost Multipath (ECMP) Failure in the OSPF Not-So-Stubby-Areas (NSSA)", pp. 1-13, A capstone paper submitted as partial fulfillment of the requirements for the degree of Masters in Interdisciplinary Telecommunications at the University of Colorado, Boulder, May 4, 2012.

* cited by examiner

COMPUTING FORWARDING TABLES FOR LINK FAILURES

FIELD OF THE INVENTION

The present invention relates generally to the field of routing data in a network, and more particularly to link failure response in bridging networks.

BACKGROUND OF THE INVENTION

The data link layer, layer 2 of the seven-layer OSI (open systems interconnection) model of computer networking, is the protocol layer that transfers data between adjacent network nodes in a wide area network or between nodes on the same local area network segment. The data link layer provides the functional and procedural means to transfer data between network entities.

Unicast transmission, of unicast traffic, is the sending of data-link frames from a single source to a single network destination identified by a unique IP (internet protocol) address. Multi-destination transmission is the sending of data-link frames in a single transmission from a single source simultaneously to either: (i) a group of destination computers (multicast); or (ii) every device on the network (broadcast).

The spanning tree protocol (STP) is a network protocol that ensures a loop-free topology for any bridged ethernet local area network (LAN). The basic function of STP is to prevent bridge loops and the broadcast radiation that results from them. The spanning tree also allows a network design to include spare, or redundant, links to provide automatic backup paths if an active link fails, without the danger of bridge loops, or the need for manual enabling/disabling of these backup links. STP creates a spanning tree within a network of connected layer-2 bridges (typically ethernet switches), and disables those links that are not part of the spanning tree, leaving a single active path between any two network nodes.

TRILL (transparent interconnection of lots of links) is an internet engineering task force (IETF) standard for enabling multipathing in a data center. The TRILL campus topology is implemented by devices called routing bridges (RBridges) or TRILL Switches. Routing bridges run a link state protocol amongst themselves. A link state protocol is one in which connectivity is broadcast to all the RBridges, so that each RBridge knows about all the other RBridges, and the connectivity between them. This gives RBridges enough information to calculate shortest path first (SPF) paths where an equal cost multipath (ECMP) routing strategy is available for unicast traffic, and calculate distribution trees for delivery of frames either to destinations whose location is unknown or to multi-destination groups.

A TRILL campus topology may support multiple topologies such that both unicast and multi-destination traffic is routed in the network. In a multi-topology network, the router uses logically different routing tables for different topologies.

ECMP is a routing strategy where next-hop frame, or packet, forwarding to a single destination can occur over multiple equal cost paths, or routes. Equal cost paths are those paths, or routes, that tie for top place in routing metric calculations.

The control plane is the part of the router architecture that is concerned with drawing the network map, or the information in a routing table that defines what to do with incoming frames. In most cases, the routing table contains a list of destination addresses and the outgoing node(s) associated with them.

The forwarding plane, sometimes called the data plane, defines the part of the router architecture that decides what to do with frames arriving on an inbound node. Most commonly, it refers to a routing table in which the router looks up the destination address of the incoming frame and retrieves the information necessary to determine the route from the receiving node, through the internal forwarding fabric of the router, and to the proper outgoing node(s).

SUMMARY

A method for maintaining a bridging network communication path table is presented including: determining a failed communication link between a first bridge computer and a second bridge computer in the bridging network; identifying, in the communication path table, a first path that includes the failed communication link; and indicating that the first path is not active.

DETAILED DESCRIPTION

This Detailed Description section is divided into the following sub-sections: (i) The Hardware and Software Environment; (ii) First Embodiment; (iii) Further Comments and/or Embodiments; and (iv) Definitions.

I. THE HARDWARE AND SOFTWARE ENVIRONMENT

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
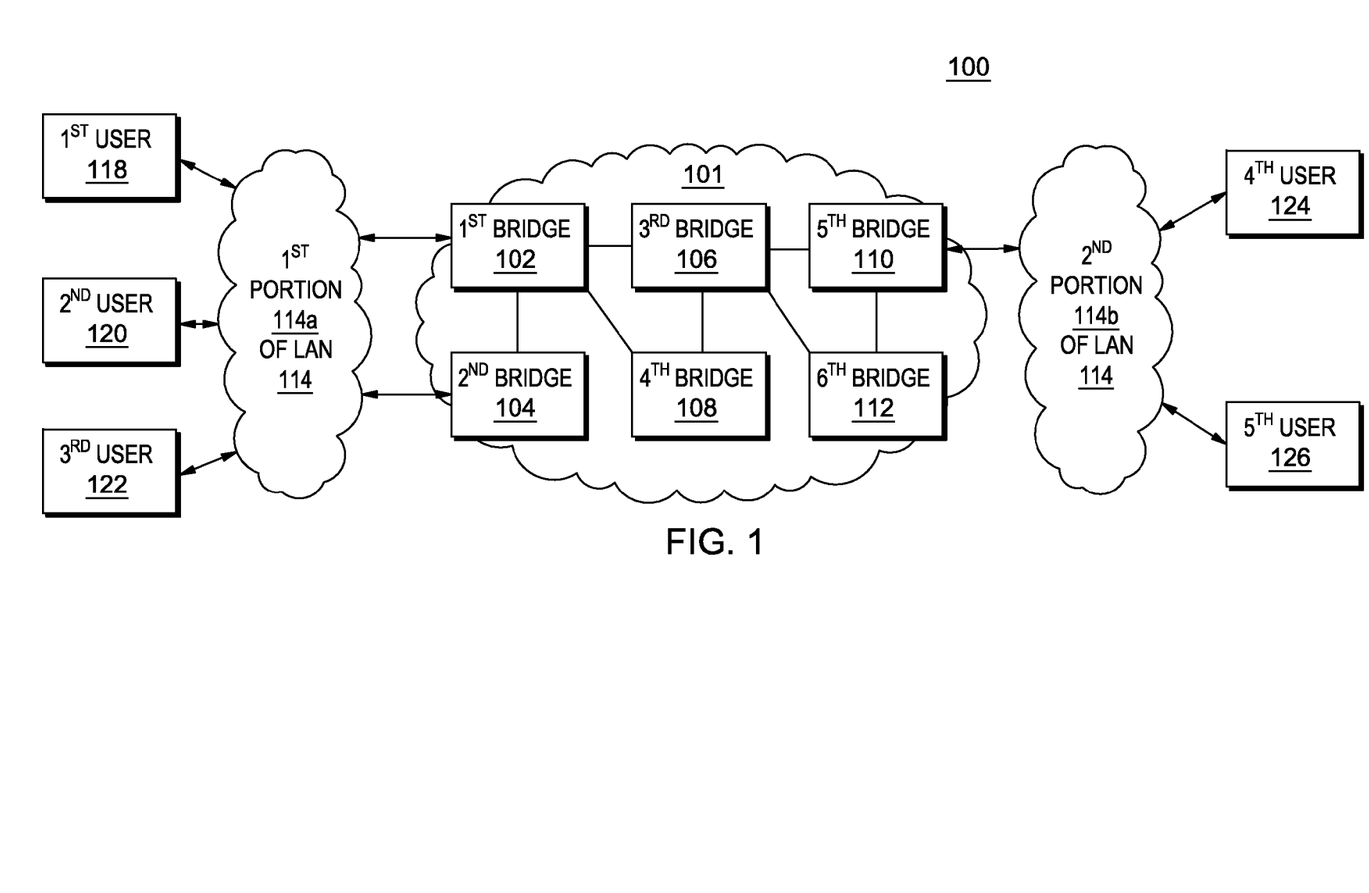
FIG. 1 is a schematic view of a first embodiment of a networked computers system according to the present invention.
Figure 2:
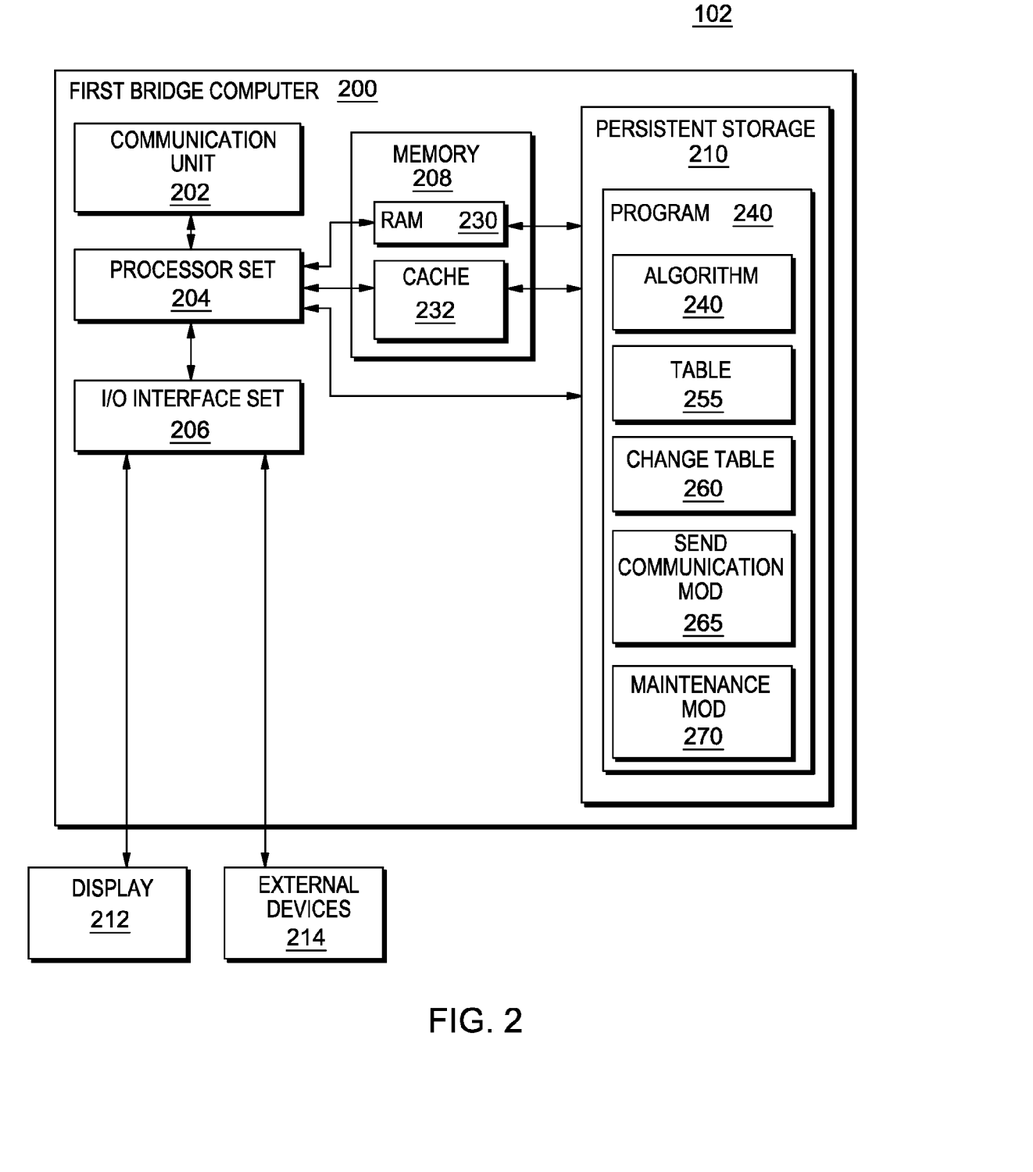
FIG. 2 is a schematic view of a portion of the first embodiment networked computers system.

An embodiment of a hardware and software environment in which the present invention may be utilized will now be described in detail with reference to the Figures. FIGS. 1 and 2 collectively make up a functional block diagram illustrating various portions of distributed data processing system 100, including: bridging network 101; bridge sub-systems 102, 104, 106, 108, 110, 112; first portion 114$a$ of local area network (LAN) 114; second portion 114$b$ of LAN 114; user sub-systems 118, 120, 122, 124, 126; first bridge computer 200; communication unit 202; processor set 204; input/output (i/o) interface set 206; memory device 208; persistent storage device 210; display device 212; external device set 214; random access memory (RAM) device 230; cache memory device 232; program 240; algorithm module 250; table 255; change table module 260; send communication module 265; and maintenance module 270.

As shown in FIG. 2, bridge sub-system 102 is built and programmed to communicate data (for example, packetized data) between portions of LAN 114. For this reason, bridge computer 200 is a special purpose computer built and programmed specifically for communicating quickly and efficiently, as will be understood by those of skill in the data network communication design art. Bridging network 101 may further include switch computers (not shown). Program 240 is a is a collection of machine readable instructions and/or data that is used to create, manage and control network communication bridge network related functions that will be discussed in detail, below, in the First Embodiment sub-section of this Detailed Description section.

Bridge sub-system 102 is capable of communicating with other bridge sub-systems via bridging network 101 (see FIG. 1). Bridging network 101 can be, for example, a local area network (LAN), a wide area network (WAN) such as the Internet, or a combination of the two, and can include wired, wireless, or fiber optic connections. In general, bridging network 101 can be any combination of connections and protocols that will support communications between bridge and user sub-systems.

It should be appreciated that FIGS. 1 and 2, taken together, provide only an illustration of one implementation (that is, system 100) and does not imply any limitations with regard to the specific network architecture of the various environments in which different embodiments may be implemented. Many modifications to the depicted environment may be made, especially with respect to current and anticipated future advances in cloud computing, distributed computing, smaller computing devices, network communications and the like.

As shown in FIG. 2, bridge sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 240 is stored in persistent storage 210 for access and/or execution by one or more of the respective computer processors 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information. The various modules and/or data blocks 250, 255, 260, 265, 270 will be discussed in detail below, in the First Embodiment sub-section of this Detailed Description section.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as bridge sub-systems 104, 106, 108, 110, 112 and LAN network 114 (shown as two portions, 114a and 114b). In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with first bridge computer 200. For example, I/O interface set 206 provides a connection to external device set 214. External device set 214 will typically include devices such as a keyboard, keypad, touch screen, and/or some other suitable input device. External device set 214 can also include portable computer-readable storage media such as, for example, thumb drives, portable optical or magnetic disks, and memory cards. Software and data used to practice embodiments of the present invention, for example, program 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. FIRST EMBODIMENT

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
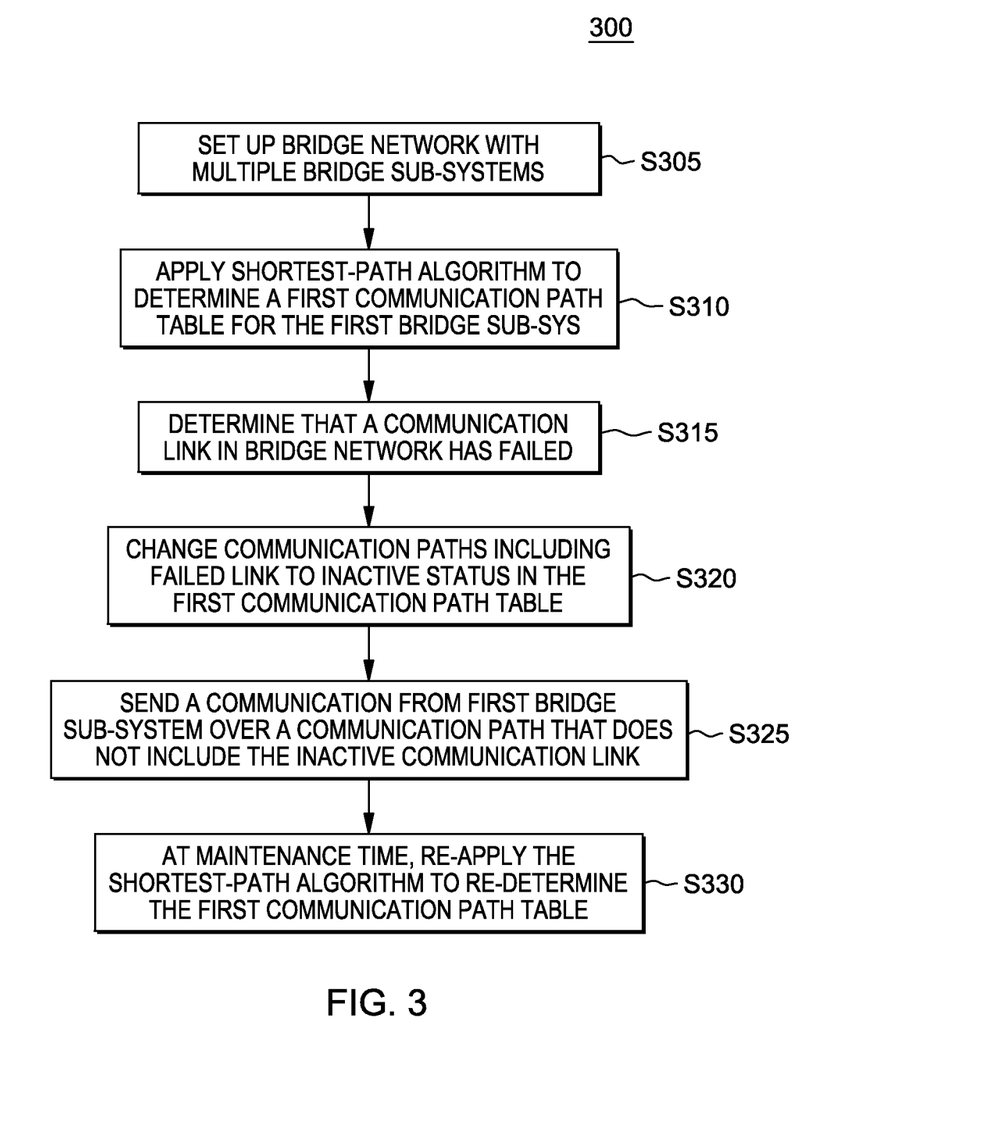
FIG. 3 is a flowchart showing a method performed, at least in part, by the first embodiment computer system.

FIG. 2 shows program 240 for performing at least some of the method steps of flow chart 300. FIG. 3 shows a flow chart 300 depicting a method according to the present invention. This software and associated method will now be discussed, over the course of the following paragraphs, with extensive reference to FIG. 2 (for the software blocks) and FIG. 3 (for the method step blocks).

Processing begins at step S305, where network set-up technicians (not shown) set up bridge network 101 (see FIG. 1) with multiple networked bridge sub-systems 102, 104, 106, 108, 110, and 112 (see FIG. 1). A bridge network transfers communication traffic, or, simply, data, from one network to another network via various communication paths made up of one or more communication links between the individual bridge sub-systems making up the bridge network. In this embodiment, bridge network 101 transfers data from first portion 114a of LAN 114 to second portion 114b of LAN 114 (see FIG. 1). In some embodiments of the present disclosure, the bridge network includes conventional routing bridges in a TRILL campus topology. TRILL-based embodiments are discussed in more detail below in the Further Comments and/or Embodiments Section of this Detailed Description.

Processing proceeds to step S310, where algorithm module 250 applies a shortest path first (SPF) algorithm to determine a first communication path table 255 for first bridge sub-system 102. In this embodiment, each bridge sub-system has a corresponding communication path table (not shown for bridge sub-systems 104, 106, 108, 110, and 112). Alternatively, the control plane in the router architecture (not shown) has a bridge network communication path table (not shown) describing the links and corresponding paths throughout the bridge network. As a further alternative, a different algorithm (now known or to be developed in the future), other than SPF, could be used to determine the various paths stored in table 255. However, even under a different algorithm, these various paths will: (i) be made up of links (which are susceptible to breakage); and (ii) have some order of relative preference.

Each path determined by the SPF algorithm is assigned values representing one or more path characteristics. In this embodiment, a "link" value is assigned to each communication path. The "link" value is the number of links that make up a single communication path. Alternatively, the path determination is based on path characteristics within a given communication path including, but not limited to: (i) the reliability of the links; (ii) the status of the links; and/or (iii) the volume of traffic expected to be transferred through the links. Table 1, shown below, illustrates one embodiment of first communication path table 255 determined by algorithm mod 250 for first bridge sub-system 102.

TABLE 1

FIRST COMMUNICATION PATH TABLE:
INITIAL STATUS.

| DESTINATION | PATH | NO. of LINKS | ACTIVE |
|---|---|---|---|
| $2^{ND}$ BRIDGE | 1-2 | 1 | Y |
| $2^{ND}$ BRIDGE | 1-4; 4-2 | 2 | Y |
| $2^{ND}$ BRIDGE | 1-3; 3-4; 4-2 | 3 | Y |
| ... | ... | ... | ... |
| $6^{TH}$ BRIDGE | 1-4; 4-3; 3-5; 5-6 | 4 | Y |
| $6^{TH}$ BRIDGE | 1-2; 2-4; 4-3; 3-5; 5-6 | 5 | Y |

Note how each of the five paths shown in (abbreviated) Table 1 correspond to the link lines shown within network 101 in FIG. 1. Further note that each path only passes through a given bridge sub-system 104, 106, 108, 110, 112 once on its way to its path destination. In the above first communication path table, the link value of each communication path is recorded. As mentioned above, the link value refers to the number of links in a given communication path. There are three communication paths shown in Table 1 that reach second bridge 104. The paths in Table 1 are denoted by the one or more communication links that make up each path. For example, a link may transfer data from first bridge sub-system 102 to second bridge sub-system 104. The example communication link is written "1-2," where the first number in the number pair is the originating bridge sub-system number and the second number is the destination bridge sub-system number. Each of the links in a path is listed sequentially by corresponding number pair and separated by a semi-colon. One path in Table 1 is made up of a single link, 1-2, with a corresponding link value of 1. There is also shown a communication path made up of three links, 1-3; 3-4; 4-2, with a corresponding link value of 3.

The communication path table includes an indication as to whether the corresponding path is active or inactive according to the column labeled "active." In this example, each of the shown paths is active. It should be understood that additional or alternative path characteristics may be tracked in a communication path table.

Processing proceeds to step S315, where change table module 260 determines that a communication link in bridge network 101 has failed. When a communication link fails, the data traffic is unable to transfer between the two bridge sub-systems that communicate through the failed link. For example, when the communication link between first bridge 102 and second bridge 104 (shown in FIG. 1) fails, the change table module determines that a failure has occurred. Alternatively, a control plane in the router architecture (not shown) determines that a communication link has failed, or is down.

Processing proceeds to step S320, where change table module 260 changes communication path tables in the bridge network to indicate that any paths including the failed link are inactive. In Table 2, showing another embodiment of first communication path table 255, the failed paths are indicated by setting the status of the path to inactive (shown by an "N" in the active status column).

TABLE 2

FIRST COMMUNICATION PATH TABLE:
CHANGED AT STEP S320.

| DESTINATION | PATH | NO. of LINKS | ACTIVE |
|---|---|---|---|
| 2ND BRIDGE | 1-2 | 1 | N |
| 2ND BRIDGE | 1-4; 4-2 | 2 | Y |
| 2ND BRIDGE | 1-3; 3-4; 4-2 | 3 | Y |
| ... | ... | ... | ... |
| 6TH BRIDGE | 1-4; 4-3; 3-5; 5-6 | 4 | Y |
| 6TH BRIDGE | 1-2; 2-4; 4-3; 3-5; 5-6 | 5 | N |

Continuing with the example above, where the communication link between bridge sub-system 102 and bridge sub-system 104, or link 1-2, has failed, change table mod 260 changes the first communication path table from the one shown in Table 1 to the communication path table shown in Table 2. Table 2 includes two paths that use the communication link 1-2. Those paths that use link 1-2 are shown in Table 2 as inactive, that is, the active column is marked "N."

Processing proceeds to step S325, where send communication module 265 transfers communication data from first bridge sub-system 102 over a communication path that does not include inactive communication link 1-2. As can be seen in Table 2, there is more than one active communication path through which first bridge sub-system 102 can reach second bridge sub-system 104. In this embodiment, the new communication path is the active path having the least cost. Alternatively, the new communication path is one that meets another specified path characteristic(s).

Processing proceeds to step S330, where maintenance module 270 re-applies the SPF algorithm to re-determine the first communication path table 255 and the corresponding tables of bridge sub-systems 104, 106, 108, 110, and 112. This recalculation in done at relatively large time intervals in the normal course of maintenance. This means that step S325 may be repeated a great number of times before step S330 is performed. When communication path tables are computed by the maintenance mod, change table mod 260 changes the tables according to the re-determination. By using the inactive designations of table 255 at step S325, this saves bridge computer 200, and/or other system processing resources, from the time and/or processing burden of recalculating the entirety of table 255 every time a link breaks in the bridging network.

III. FURTHER COMMENTS AND/OR EMBODIMENTS

Some embodiments of the present disclosure recognize that, in TRILL: (i) every link up or link down indication triggers an SPF computation; (ii) this SPF computation creates new forwarding tables to route traffic; (iii) the SPF computation usually is the most CPU intensive operation in TRILL; and (iv) it is, therefore, desirable to minimize the number of SPF computations.

Some embodiments of the present disclosure may include one, or more, of the following features, characteristics, and/or advantages: (i) certain actions where ECMP routing strategy is used; (ii) optimizations such that new forwarding tables can be computed without triggering TRILL-based SPF computation; and/or (iii) providing for rapid re-routing of network traffic in response to link failures.

Some embodiments of the present disclosure detect, for every link failure, if the failed link is part of: (i) a unicast SPF ECMP topology; or (ii) a multi-destination ECMP topology. Where the failed link is part of either of the two ECMP topologies noted above, the respective unicast SPF computation or multi-destination tree creation is not triggered.

Some embodiments of the present disclosure may or may not have one, or more, of the following features, characteristics, and/or advantages: (i) construction of new forwarding tables without triggering expensive SPF computation; (ii) control plane workload reduction by not requiring an immediate SPF computation; (iii) rapid response to link failures resulting in fast re-route of network traffic; and/or (iv) minimizes network traffic disruptions.

Figure 4A:
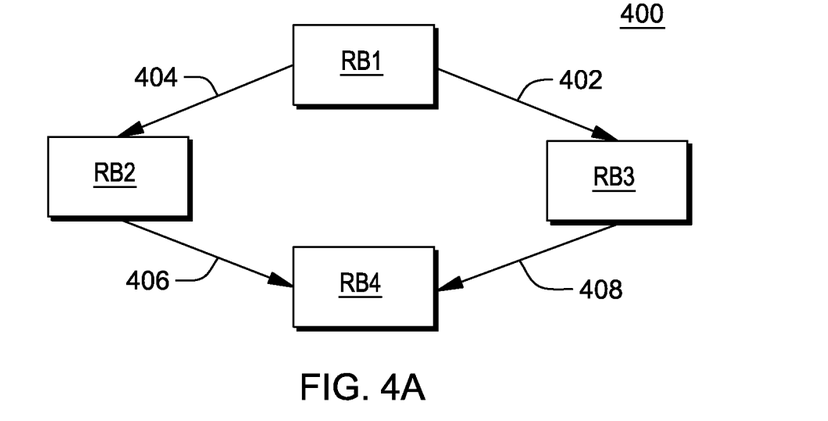
FIG. 4A is a first ECMP topology for unicast traffic, in a no broken link status, according to an embodiment of the present invention.

FIG. 4A depicts a first unicast SPF ECMP topology 400 according to an embodiment of the present invention. Unicast ECMP topology 400 includes: routing bridge, or node, RB1; routing bridge RB2; routing bridge RB3; routing bridge RB4; links 402, 404, 406, and 408.

For unicast TRILL route tables, there are two ECMP paths from RB1 to RB4. The first ECMP path is made up of links 404 and 406. The second ECMP path is made up of links 402 and 408. Each of the two ECMP paths are "equal cost" paths in that the sums of the costs of the individual links 404, 406 and 402, 408 within each path are equal. For example, the cost of each path may be five. For the first EMCP path, link 404 may have an associated cost of 3 and link 406 may have a cost of 2, while the second ECMP path includes link 402, with a cost of 1, and link 408, with a cost of 4.

Figure 4B:
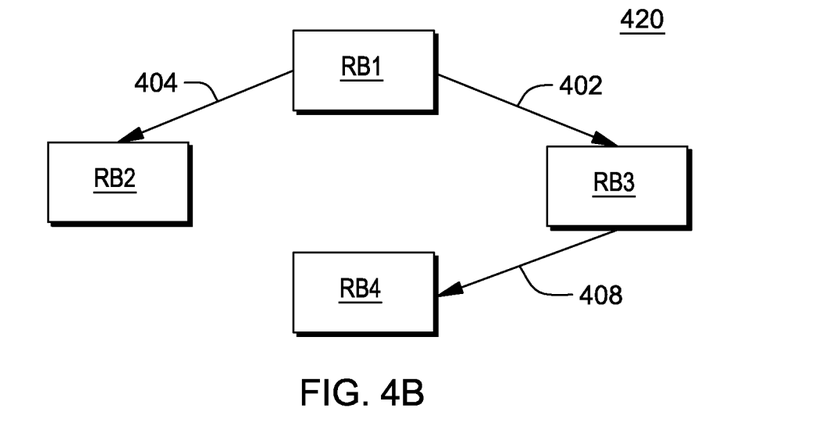
FIG. 4B is the first ECMP topology for unicast traffic, in a broken link status, according to an embodiment of the present invention.

Both ECMP paths are stored in routing bridge RB1. FIG. 4B depicts unicast SPF ECMP topology 420 according to an embodiment of the present invention. In FIG. 4B, ECMP link 406 is not shown (see FIG. 4A) because it is down. RB1 detects that one of the two ECMP links to RB4 is down by consulting its routing table. Because there are two ECMP paths stored in RB1's routing table, when 406 is down, the alternative path of links 402 and 408 is programmed (in a routing table in RB1) as the path to be used. It is because the routing bridge retains a record of the alternate ECMP path that the control plane is able to push the alternate path when the active path goes down. By pushing the alternative path, an SPF computation is avoided, or, at least, postponed until routine maintenance occurs. The broken ECMP link 406 may be deleted from the hardware and software tables without re-computing the SPF. Alternatively, the broken link continues to be stored in the routing bridge for later use when the broken link comes back up.

Figure 5A:
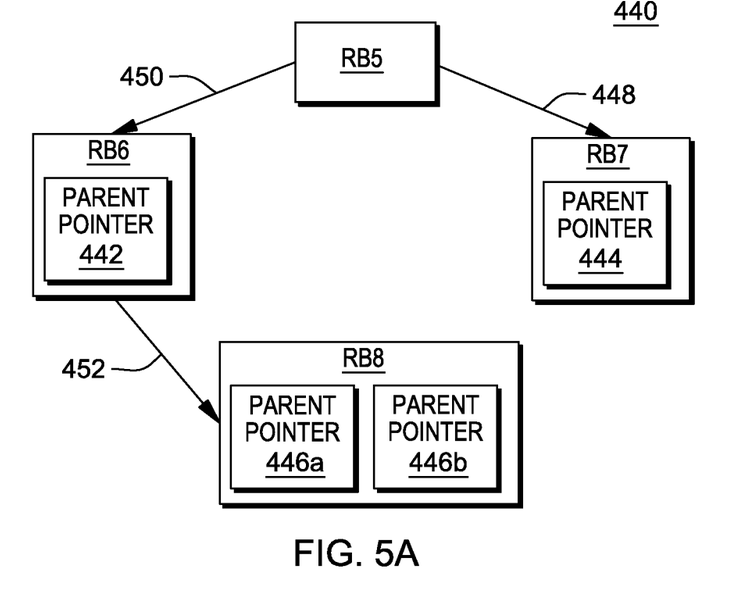
FIG. 5A is a second ECMP topology for multi-destination traffic, in a no broken link status, according to an embodiment of the present invention.

FIG. 5A depicts a first multi-destination ECMP topology, or multi-destination tree, according to an embodiment of the present invention. Multi-destination tree 440 is a loop free tree including: highest priority tree root RB5; nodes RB6, RB7, and RB8; parent pointers 442, 444; parent pointer set 446a, 446b; and links 448, 450, 452.

Where RB5 is the highest priority tree root, the multi-destination tree is created with each other node have parent pointer(s) toward root RB5. At each node, the parent pointers are maintained such that: (i) RB6 includes parent pointer 442 directed to RB5; (ii) RB73 includes parent pointer 444 directed to RB5; and (iii) RB8 has two parent pointers directed to intermediate nodes that reach root RB5. Parent pointer 446a is directed to RB6 and parent pointer 446b is directed to RB7. However, only link 452, directed by parent pointer 446a, is used for the loop free tree according to FIG. 5A.

Figure 5B:
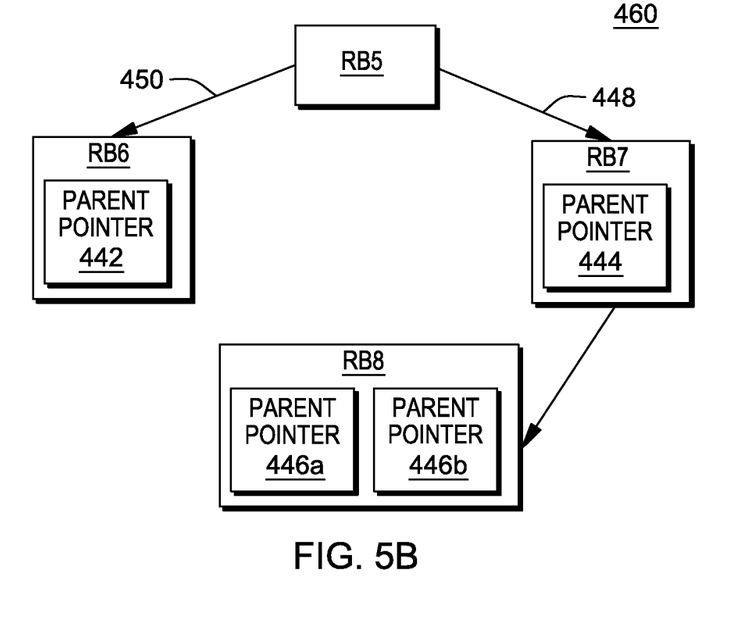
FIG. 5B is the second ECMP topology for multi-destination traffic, in a broken link status, according to an embodiment of the present invention.

FIG. 5B depicts a second multi-destination ECMP topology, or multi-destination tree, according to an embodiment of the present invention. Multi-destination tree 460 is a loop free tree including: highest priority tree root RB5; nodes RB6, RB7, and RB8; parent pointers 442, 444; parent pointer set 446a, 446b; and routes 448, 450, 462. In FIG. 5B link 452 is not shown (see FIG. 5A). RB5 detects that the link down communicates with destination node, RB8, which has two parent pointers. Because there are two parent pointers, RB5 reprograms its routing table to use parent pointer 446a, which is directed to RB6 over active link 452. In this example, new multi-destination tree 460 is quickly constructed using the stored parent pointer 446b without the need to trigger an immediate SPF computation to create a new tree.

Some embodiments of the present disclosure recognize that TRILL is different from many other protocols in that it utilizes tables for both unicast and multi-destination frames. ECMP detection is different in each set, or protocol. Recovery from a link up/down condition is different with TRILL than other link-state routing protocols such as OSPF (open shortest path first), in that OSPF only computes unicast paths.

Some embodiments of the present disclosure avoid the high cost of performing the SPF computation at each status change by recording for a first node each ECMP path from the first node to a next node for use by the control plane. In that way, the control plane's response time for alternative link detection is faster because there is no need to compute the SPF for the ECMP paths.

Some embodiments of the present disclosure record the fact that some of the paths in a network are ECMP paths and there is the ability to reach from a first node to a second node through multiple paths when the shortest path graph is computed. Typically, in the TRILL topology, one path is normally set as the active path.

Some embodiments of the present disclosure, record the fact that there are multiple paths to reach from, for example, Node A to Node B even if the alternative communication paths are not active. In this way, when one link goes down, a replacement link is quickly identified and installed into the forwarding database of the corresponding node. The information regarding the failed link may be applied to the TRILL topology, in a periodic time, during regular maintenance. At that time, an SPF graph is re-computed for the current system. At times other than routine maintenance, a running change is made possible in response to a failed link by recording the alternative ECMP paths that were not selected during previous SPF computations.

Some embodiments of the present disclosure use the SPF graph information to recognize the paths having ECMP links. One of the ECMP links identified in the SPF computation is typically selected using logic including, but not limited to: (i) a hashing process; and/or (ii) the highest assigned number. When the chosen ECMP link goes down, or fails, the routing bridge is able to quickly program the hardware with a new ECMP link that is available.

Some embodiments of the present disclosure apply to network traffic that is either: (i) multi-destination; or (ii) unicast. Multi-destination, as the name suggests, is a communication that is not directed to an individual destination, but to multiple nodes, or RBridges. The only difference between unicast and multi-destination is that there are two kinds of topology calculations. For the multi-destination calculation, even in the hardware, there is no way to actually look at multiple paths, because only one path is selected. For additional paths in a multi-destination communication, there must be another tree. For unicast communications, there is an ability to actually use multiple paths, but the ECMP link options still have to be tracked to avoid an SPF re-calculation when the active ECMP link fails.

Some embodiments of the present disclosure include two steps: (i) quick detection of whether or not the failed path is due to a failed ECMP link; and (ii) once detected, how to actually use the information to program it to avoid the resource demanding SPF computation.

Some embodiments of the present disclosure detect an ECMP path by reference to pointers. When a failure occurs, a determination is made as to whether there are any pointers, which are associated with multi-destination traffic. If the number of parent pointers is greater than one, then there are at least two parents, so the corresponding link must be part of a multi-destination tree.

Some embodiments of the present disclosure use a method including the steps that follow: (i) create an SPF graph; (ii) reach steady state operations; (iii) build a topology; (iv) record the topology; and (v) when any state change notice is received from the network, a decision regarding whether or not to run an SPF computation is made; (vi) determine if there is a faster way to determine an alternative link; and (vii) program the hardware.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Electrically Connected: means either directly electrically connected, or indirectly electrically connected, such that intervening elements are present; in an indirect electrical connection, the intervening elements may include inductors and/or transformers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:
1. A method for maintaining a bridging network communication path table, the method comprising:
    performing a shortest path first (SPF) computation to build a communication path table for a bridging network that has a transparent interconnection of lots of links (TRILL) topology with equal cost multipath (ECMP) paths, wherein the communication path table indicates a plurality of active ECMP paths between a first routing bridge and a second routing bridge in the bridging network, and wherein the SPF computation ranks each active ECMP path of the plurality of active ECMP paths based on: a link value that represents a number of links included in the active ECMP path, a reliability value for one or more of the links included in the active ECMP path, and an expected volume of traffic to be transferred through one or more of the links included in the active ECMP path;

determining a failed communication link between the first routing bridge and the second routing bridge in the bridging network;

identifying, in the communication path table, a first ECMP path of the plurality of active ECMP paths that includes the failed communication link; and responsive to identifying the first ECMP path that includes the failed communication link, adding an indication to the communication path table that the first ECMP path is not active and postponing an SPF computation to rebuild the communication path table until a later time.

2. The method of claim 1 wherein the communication path table is stored at a third routing bridge, and the communication path table indicates paths originating at the third routing bridge.

3. The method of claim 1 wherein the communication path table is for one of: unicast traffic or multi-destination traffic.

4. A computer program product for maintaining a bridging network communication path table, the computer program product comprising program instructions stored on a computer-readable hardware storage device, the stored program instructions comprising:

program instructions to perform a shortest path first (SPF) computation to build a communication path table for a bridging network that has a transparent interconnection of lots of links (TRILL) topology with equal cost multipath (ECMP) paths, wherein the communication path table indicates a plurality of active ECMP paths between a first routing bridge and a second routing bridge in the bridging network, and wherein the SPF computation ranks each active ECMP path of the plurality of active ECMP paths based on: a link value that represents a number of links included in the active ECMP path, a reliability value for one or more of the links included in the active ECMP path, and an expected volume of traffic to be transferred through one or more of the links included in the active ECMP path;

program instructions to determine a failed communication link between the first routing bridge and the second routing bridge in the bridging network;

program instructions to identify, in the communication path table, a first ECMP path of the plurality of active ECMP paths that includes the failed communication link; and program instructions to, responsive to identifying the first ECMP path that includes the failed communication link, add an indication to the communication path table that the first ECMP path is not active and postpone an SPF computation to rebuild the communication path table until a later time.

5. The computer program product of claim 4 wherein the communication path table is stored at a third routing bridge, and the communication path table indicates paths originating at the third routing bridge.

6. The computer program product of claim 4 wherein the communication path table is for one of: unicast traffic or multi-destination traffic.

7. A computer system for maintaining a bridging network communication path table, the computer system comprising:

a processor(s) set; and a computer-readable hardware storage device; and program instructions stored on the computer-readable hardware storage device for execution by the processor(s) set, the stored program instructions comprising:

program instructions to perform a shortest path first (SPF) computation to build a communication path table for a bridging network that has a transparent interconnection of lots of links (TRILL) topology with equal cost multipath (ECMP) paths, wherein the communication path table indicates a plurality of active ECMP paths between a first routing bridge and a second routing bridge in the bridging network, and wherein the SPF computation ranks each active ECMP path of the plurality of active ECMP paths based on: a link value that represents a number of links included in the active ECMP path, a reliability value for one or more of the links included in the active ECMP path, and an expected volume of traffic to be transferred through one or more of the links included in the active ECMP path;

program instructions to determine a failed communication link between the first routing bridge and the second routing bridge in the bridging network;

program instructions to identify, in the communication path table, a first ECMP path of the plurality of active ECMP paths that includes the failed communication link; and program instructions to, responsive to identifying the first ECMP path that includes the failed communication link, add an indication to the communication path table that the first ECMP path is not active and postpone an SPF computation to rebuild the communication path table until a later time.

8. The computer system of claim 7 wherein the communication path table is stored at a third routing bridge, and the communication path table indicates paths originating at the third routing bridge.

9. The computer system of claim 7 wherein the communication path table is for one of: unicast traffic or multi-destination traffic.

10. The method of claim 1, further comprising:

identifying a second ECMP path of the plurality of active paths in the communication path table; and re-routing network traffic between the first routing bridge and the second routing bridge using the second ECMP path.

11. The method of claim 1, further comprising:

responsive to determining that the failed communication link between the first routing bridge and the second routing bridge has been restored, indicating that the first ECMP path is active.

12. The method of claim 1, wherein the SPF computation is postponed until a routine maintenance period occurs.

* * * * *